United States Patent
Borkenhagen et al.

(10) Patent No.: US 9,817,735 B2
(45) Date of Patent: Nov. 14, 2017

(54) REPAIRING A HARDWARE COMPONENT OF A COMPUTING SYSTEM WHILE WORKLOAD CONTINUES TO EXECUTE ON THE COMPUTING SYSTEM

(71) Applicant: LENOVO ENTERPRISE SOLUTIONS (SINGAPORE) PTE. LTD., Singapore (SG)

(72) Inventors: John M. Borkenhagen, Rochester, MN (US); Sumeet Kochar, Cary, NC (US); Randolph S. Kolvick, Durham, NC (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 139 days.

(21) Appl. No.: 14/823,616

(22) Filed: Aug. 11, 2015

(65) Prior Publication Data

US 2017/0046236 A1 Feb. 16, 2017

(51) Int. Cl.
*G06F 11/20* (2006.01)
*G06F 9/455* (2006.01)
*G06F 11/16* (2006.01)

(52) U.S. Cl.
CPC ........ *G06F 11/203* (2013.01); *G06F 9/45558* (2013.01); *G06F 11/20* (2013.01); *G06F 11/16* (2013.01); *G06F 2009/4557* (2013.01); *G06F 2201/805* (2013.01); *G06F 2201/815* (2013.01)

(58) Field of Classification Search
CPC ........ G06F 11/16; G06F 11/166; G06F 11/20; G06F 11/2097
See application file for complete search history.

(56) References Cited

U.S. PATENT DOCUMENTS

| 6,851,005 B1* | 2/2005 | Gnanasivam | G06F 3/0622 710/107 |
| 2003/0188222 A1* | 10/2003 | Abbondanzio | G06F 11/2028 714/12 |
| 2003/0212931 A1* | 11/2003 | Hetrick | G06F 11/1092 714/710 |
| 2005/0154937 A1* | 7/2005 | Achiwa | G06F 11/2023 714/6.3 |

OTHER PUBLICATIONS

Wikipedia's Hypervisor historical version from Aug. 6, 2015 https://en.wikipedia.org/w/index.php?title=Hypervisor&oldid=674817981.*
Solarwinds, "Dynamic Statistical Network Baselines", *Network Performance Monitor v11.5*, solarwinds.com (online), accessed Apr. 7, 2015, 10 pages, URL: www.solarwinds.com/network-performance-monitor.aspx.

* cited by examiner

*Primary Examiner* — Joseph Schell
(74) *Attorney, Agent, or Firm* — Brandon C. Kennedy; Jason A. Friday; Kennedy Lenart Spraggins LLP

(57) ABSTRACT

Hardware component repair in a computing system while workload continues to execute on the computing system includes receiving an indication that an operational parameter of a first hardware resource of said computing system does not meet operational acceptability criteria; migrating workload of the computing system from said first hardware resource to a second hardware resource within the computing system; and halting operation of said first hardware resource for repair.

20 Claims, 4 Drawing Sheets

REPAIRING A HARDWARE COMPONENT OF A COMPUTING SYSTEM WHILE WORKLOAD CONTINUES TO EXECUTE ON THE COMPUTING SYSTEM

BACKGROUND OF THE INVENTION

Field of the Invention

The field of the invention is data processing, or, more specifically, methods, apparatus, and products for repairing a hardware component of a computing system while workload continues to execute on the computing system.

Description of Related Art

Enterprise-level reliability and serviceability (RAS) is rapidly moving toward the processor space. Industry processors and chipsets are continually improving and adding features like live error recovery, recovery of links, spare lands for fail over, and the ability to accept hot-add or hot-replace of hardware components. Industry software products, such as hypervisors and operating systems, however, have not kept pace with the improvements and additional features provided by such processors. That is, enterprise-level software is not utilizing the additional features and improvements exposed by the processors. Instead, vendors of such industry software products tend to focus improvements on other areas, such as migration of workload between entire computing systems. Such migration, however, requires spare computing systems for workload as well as time to migrate the workload.

SUMMARY OF THE INVENTION

Methods, apparatus, and products for repairing a hardware component of a computing system while workload continues to execute on the computing system are disclosed in this specification. Such repair may include receiving, by a hypervisor, an indication that an operational parameter of a first hardware resource of said computing system does not meet operational acceptability criteria; migrating, by the hypervisor, workload of the computing system from said first hardware resource to a second hardware resource within the computing system; and halting, by the hypervisor, operation of said first hardware resource for repair.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
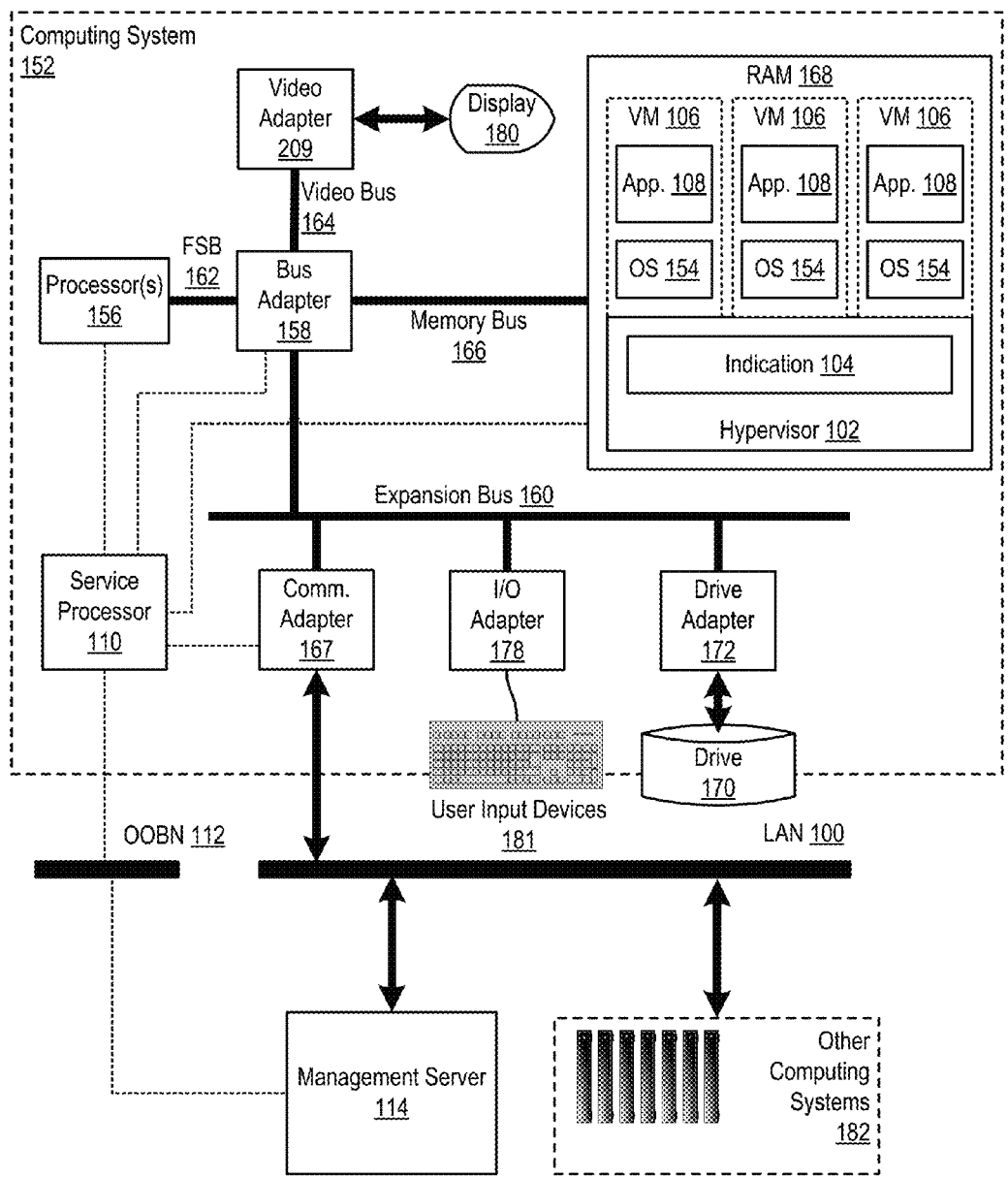
FIG. 1 sets forth a network diagram of a system configured for repair of a hardware component of a computing system while workload continues to execute on the computing system according to embodiments of the present invention.

Exemplary methods, apparatus, and products for repairing a hardware component of a computing system while workload continues to execute on the computing system in accordance with the present invention are described with reference to the accompanying drawings, beginning with FIG. 1. FIG. 1 sets forth a network diagram of a system configured for repair of a hardware component of a computing system while workload continues to execute on the computing system according to embodiments of the present invention. The system of FIG. 1 includes a computing system (152). The computing system (152) may be a server, a personal computer, a laptop, or any computing device that may be configured for hardware component repair in accordance with embodiments of the present invention. In some embodiments, for example, the computing system (152) is implemented as a server in a data center that includes many other servers.

The example computing system (152) of FIG. 1 is an example of automated computing machinery with a number of different hardware components. Examples of hardware components (also called hardware resources in this specification) include a storage drive; a computer processor; a data communications adapter; an input/output adapter; a power supply; and a Dual In-Line Memory Module (DIMM). In the example of FIG. 1, the computing system (152) includes at least one computer processor (156) or 'CPU' as well as random access memory (168) ('RAM') which is connected through a high speed memory bus (166) and bus adapter (158) to processor (156) and to other components of the computing system (152).

Stored in RAM (168) is a hypervisor (102), also called a virtual machine monitor ('VMM'). The hypervisor (102) is a module of computer program instructions in the form of software, firmware or hardware that creates and runs virtual machines by allocating hardware and firmware resources of the computing system amongst the virtual machines. Due to such allocation, from the perspective of the virtual machine's operating system, each virtual machine is a separate physical computer. A computer on which a hypervisor is running one or more virtual machines is defined as a host machine. Each virtual machine is called a guest machine. In the example of FIG. 1, the hypervisor (102) supports execution of three virtual machines (106). Each of the virtual machines (106) includes an instance of an operating system (154) and one or more user-level applications (108). Although the hypervisor (102) in the example of FIG. 1 is depicted as operating in RAM, readers of skill in the art will recognize that a hypervisor may also operate from other types of memory, such as processor level memory, flash memory, RAM disks, optical drives, and so on.

The hypervisor (102) in the example of FIG. 1 is configured to support repairing a hardware component of the computing system (152) while workload continues to execute on the computing system in accordance with embodiments of the present invention. The term 'workload' as used here may refer to any computer program instructions executing on the computing system such as the virtual machines, the applications, the operating system, and so on.

To that end, the hypervisor (102) in the example of FIG. 1 may receive an indication (104) that an operational parameter of a first hardware resource of the computing system does not meet operational acceptability criteria. An operational parameter of a hardware resource may include any characteristic of a hardware resource. Examples of such operational parameters may include temperature of a processor or host bus adapter, speed of a memory bus, memory error rate of a Dual In-line memory module, and the like. Another operational parameter of a hardware resource may be the hardware resources' availability or requirement of an upgrade.

The operational acceptability criteria is any criteria that, when not met, indicates a hardware resource is to be repaired. In some instances, an operational parameter that does not meet operational acceptability criteria indicates that a hardware resource has failed, in other instances the failure to meet operational acceptability criteria may indicate that the hardware resource is in danger of failing but has not yet failed, and in yet other cases the failure to meet operational acceptability criteria may indicate that the hardware resource is operating properly, but is due for an upgrade. Examples of operational acceptability criteria may include a processor's temperature exceeding a predefined tolerance, a maximum number of memory errors for a DIMM exceeding a predefined threshold, a rate of packet loss of a data communications adapter exceeding a predefined threshold, and so on.

Repair, as the term is used throughout this specification may include modification of the hardware resource to return the operational parameter of the hardware resource to meet operational acceptability criteria or replacement of the hardware resource. That is, repair may include replacement of a hardware resource.

Such an indication (104) that an operational parameter of a hardware resource does not meet the acceptability criteria may be received by the hypervisor from a service processor (110). The service processor (110) is a separate, dedicated internal processor typically located on the motherboard of a server, a PCI card, or on the chassis of a blade server or telecommunications platform. The service processor operates independently from the server's CPU and operating system (OS), even if the CPU or OS is locked up or otherwise inaccessible. The service processor may monitor operation of various hardware, software, and firmware resources within the computing system (152) through an out-of-band bus (112). The service processor (110) may report such monitoring to a management server (114). In the example of FIG. 1, the service processor may be configured to monitor the hardware resources of the computing system and send an indication to the hypervisor that an operating parameter of a hardware resource does not meet operational acceptability criteria. The example service processor (110) in the example of FIG. 1 is coupled for data communications to the management server (114) through the out-of-band bus (112) as just one example data communications coupling which may be implemented between a service processor and a management server. In some embodiments, the service processor (110) may also communicate with the management server through other networks, as an alternative to or in addition to the out-of-band bus (112), such as the local area network (100).

Once the hypervisor receives the indication (104), the hypervisor may then migrate workload of the computing system from said first hardware resource to a second hardware resource within the computing system. Consider, for example, that the computing system (152) includes three processors (156) and the hypervisor allocates a separate one of the three processors to each of the virtual machines. Consider also that temperature of one of the processors exceeds a predefined threshold and the service processor sends an indication to the hypervisor of the processor's temperature failing to meet acceptability criteria. In such an example, the hypervisor may migrate the virtual machine allocated to the over-heated processor to another one of the processors.

Then, the hypervisor may halt operation of said first hardware resource for repair. Once the repair is complete the hypervisor may return the previously migrated workload to the repaired hardware resource.

In some embodiments, workload migration within the computing system may be a final mitigating step to take to enable repair of a hardware resources. To that end, the service processor (110) may identify that the operational parameter of the hardware resource does not meet the operational acceptability criteria and prior to migrating the workload from the first hardware resource to the second hardware resource within the computing system, determine whether a second computing system (182) in the data center is available as a target for failover of said first computing system. The service processor (110) may request an available target for failover from the management server (114) through the out-of-band bus (112). The management server (114) may indicate that another computing system is available for migration based on a variety of factors. In some embodiments, the management server (114) may identify computing systems that have a workload below a predefined threshold. In some embodiments, a computing system may be 'available' only if the workload is below a predefined threshold and network traffic patterns in the data center indicate bandwidth is available for migration. Workload of an entire computing system may be very large—many gigabytes (GB) or terabytes (TB) in some examples. Thus, migration of such workload across the data communications network (100) may consume a majority, all, or greater than all available bandwidth.

Responsive to determining that a second computing system is available as a target for failover of said first computing system (the management server (114) identifying a failover target to the service processor), the service processor may fail-over workload executing on said first computing system to said second computing system. Such failover may be carried out in a variety of ways including, for example, by creating a snapshot of the hypervisor and virtual machines, providing the snapshot to the failover target, and having the failover target instantiate the snapshot. In this way, the entire first computing system may be powered-off and the hardware resource having the operational parameter that does not meet operational acceptability criteria may be repaired.

In embodiments in which the management server (114) indicates that a second computing system is not available as a target for failover, the service processor (110) may attempt to drive the operational parameter of said first hardware resource to meet said operational acceptability criteria. That is, the service processor (110) may modify operation of the first computing system in a way that may drives the operational parameter of the hardware resource to meet the operational acceptability criteria. Consider, for example, that the temperature of one of the several processors (156) of the computing system (152) is exceeding a predetermined threshold. In such an example, the service processor (110) may attempt to drive the temperature of the distressed or out of specification processor below the predetermined threshold, by throttling the CPU clock speed or core operating voltage.

In such an embodiment, the service processor may be configured to send the indication (104) that the operational parameter of the hardware resource of the computing system does not meet operational acceptability criteria only if the attempt to drive the operational parameter to meet the criteria fails. In this way, repair of the hardware resource may be effected in levels of escalations. The lowest and first level includes full migration to a separate computing system, the second and higher level includes the service processor attempting to drive the operational parameter of the hardware resource to meet the acceptability criteria, and the final, highest, level includes migration within the computing system itself Further, such levels of escalation may be driven by a management software layer, such as the system management server. As mentioned above, availability of failover resources in the data center may be an input into the escalation level determination. In addition, a data center administrator defined policy may also be an input into the escalation level determination.

Also stored in RAM (168) is an operating system (154). Operating systems useful in computing systems configured repair of a hardware component while workload continues to execute on the computing system according to embodiments of the present invention include UNIX™, Linux™, Microsoft XP™, AIX™, IBM's i5/OS™, and others as will occur to those of skill in the art. The operating system (154), virtual machines (106), applications (108), and hypervisor (102) in the example of FIG. 1 are shown in RAM (168), but many components of such software typically are stored in non-volatile memory also, such as, for example, on a disk drive (170).

The computer (152) of FIG. 1 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computing systems configured for hardware component repair while workload continues to execute on the computing system according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary computer (152) of FIG. 1 includes a communications adapter (167) for data communications with other computers (182) and for data communications with a data communications network (100). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful in computing systems configured for hardware component repair while workload continues to execute on the computing system according to embodiments of the present invention include modems for wired dial-up communications, Ethernet (IEEE 802.3) adapters for wired data communications, and 802.11 adapters for wireless data communications.

The arrangement of computing systems and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Figure 2:
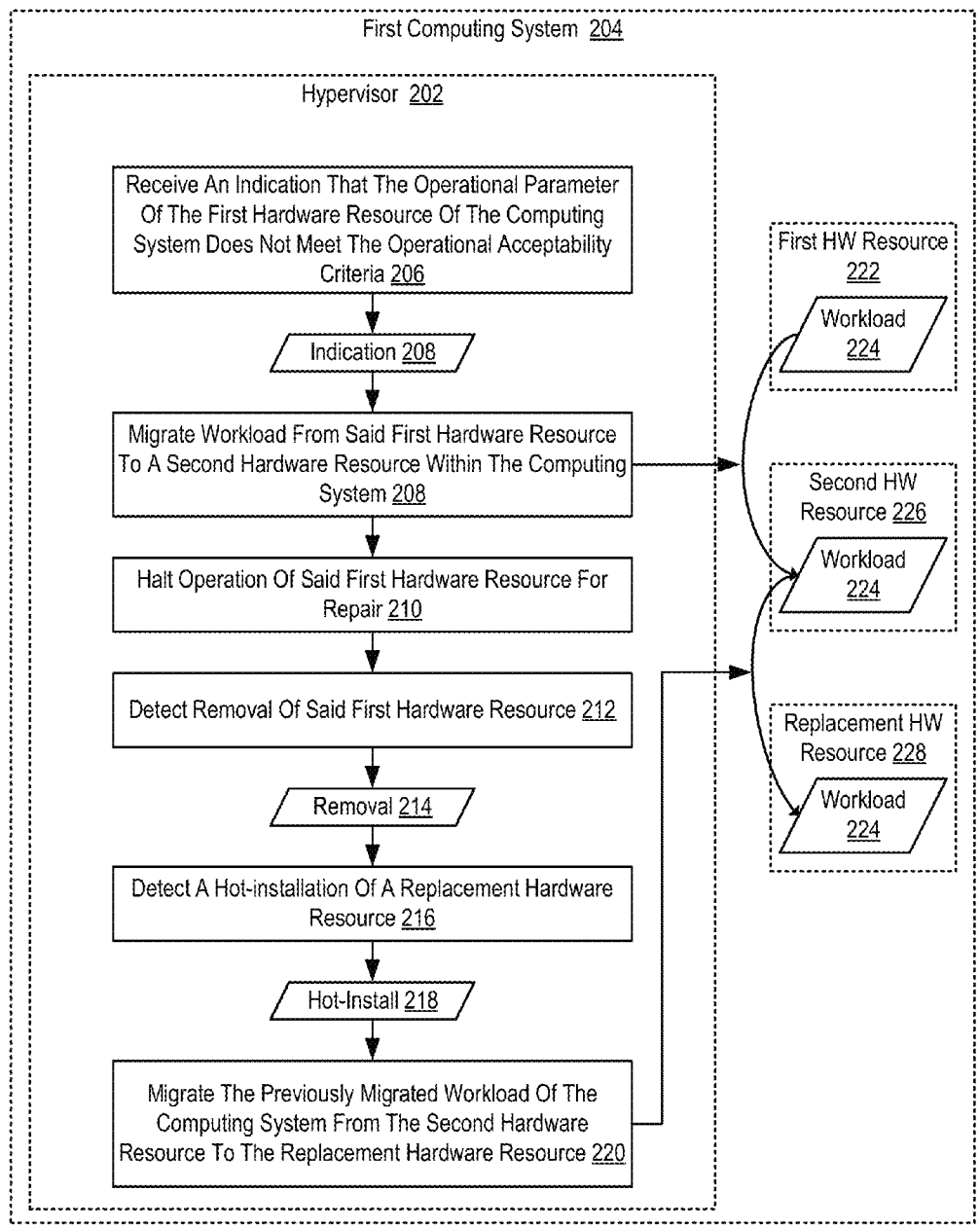
FIG. 2 sets forth a flow chart illustrating an exemplary method for repairing a hardware component of a computing system while workload continues to execute on the computing system according to embodiments of the present invention.

For further explanation, FIG. 2 sets forth a flow chart illustrating an exemplary method for repairing a hardware component of a computing system while workload continues to execute on the computing system according to embodiments of the present invention. The method of FIG. 2 includes receiving (206) an indication (208) that an operational parameter of a first hardware resource (222) of said computing system (204) does not meet operational acceptability criteria. Receiving such an indication may be carried out in a variety of ways including, for example, by receiving the indication (208) from a service processor that is configured to monitor operation of such hardware resources in the computing system. Such an indication may be in the form of an interrupt through an out-band-bus where the hypervisor includes an interrupt handler that handles such an interrupt from the hypervisor.

The method of FIG. 2 also includes migrating (208) workload (224) of the computing system from said first hardware resource (222) to a second hardware resource (226) within the computing system (204). Migrating such a workload may be carried out in a number of ways depending upon the type of workload and the type of hardware resource from which the workload is being migrated. Generally, migrating a workload may include halting execution of the workload, creating a snapshot—a copy of all data and instructions comprising the workload at a particular time—accessible to the second hardware resource and executing the snapshot on the second hardware resource. Migrating an instruction stream from one processor to another may, for example, include halting the execution of the processor and copying all registers of the processor to another processor for execution. Migrating data stored in a first DIMM may include copying the data from the first DIMM to a second DIMM that is not affected by the removal of the first DIMM. Further, the hypervisor may reallocate resources amongst virtual machines supported by the hypervisor in order to provide availability of hardware resources that may be used as a target for migration.

The method of FIG. 2 also includes halting (210) operation of said first hardware resource for repair. Halting operation of a hardware resource may include driving the hardware resource to a quiescent state in which the hardware resource is inactive or inhibited. Once in this state, a repair of various sorts may be carried out. In some embodiments, the repair includes a hot-swap with a fully functional replacement hardware resource.

To that end, the method of FIG. 2 also includes detecting (212) removal of said first hardware resource. Detecting removal may be carried out in various ways. Some hardware components may be physically configured such that when removed the bus or other communications channel coupling the hardware component to other components of the computing system indicates no device connected at one endpoint. In other embodiments, a service processor of the computing system may periodically ping hardware resources to confirm operation. In such an embodiment, the service processor may notify the hypervisor of the removal of a hardware resource when that confirmation fails. In yet other embodiments, the hardware resource itself may periodically indicate its presence to a service processor or the hypervisor directly through a heartbeat signal that, when missing for a predefined period of time, indicates the hardware resource is no longer present in the system.

The method of FIG. 2 also includes detecting (216) a hot-installation (218) of a replacement hardware resource (228). Various hardware resources such as processors, I/O adapters, and some specialized DIMMs are configured to notify a system of hot-installation. In other embodiments, a service processor of the computing system may periodically ping communications channels to determine the presence of hardware resources that were not previously present. Once the replacement hardware resource is installed, the method of FIG. 2 continues by migrating (220) the previously migrated workload (224) of the computing system from the second hardware resource (226) to the replacement hardware resource (224).

Figure 3:
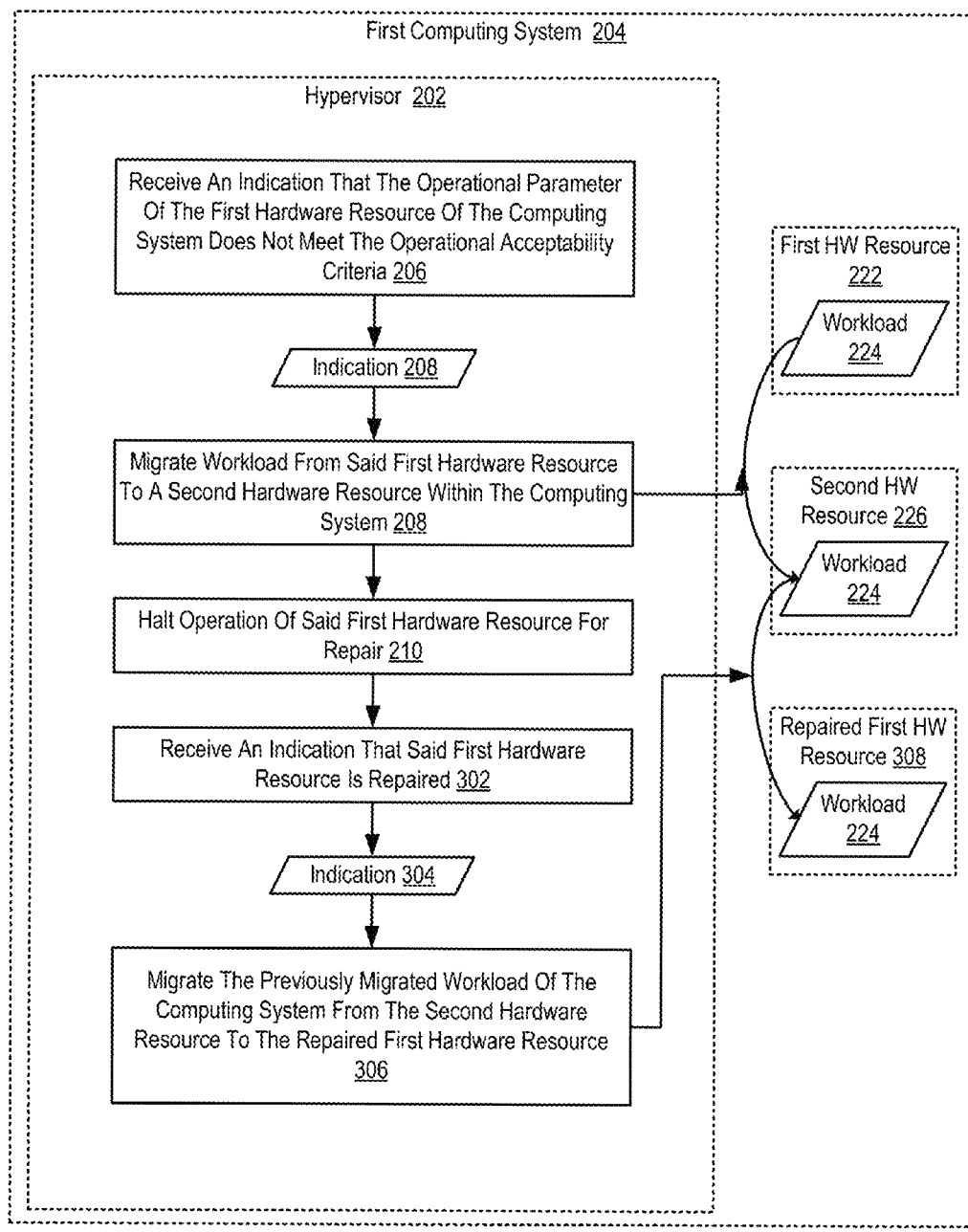
FIG. 3 sets forth a flow chart illustrating a further exemplary method for repairing a hardware component of a computing system while workload continues to execute on the computing system according to embodiments of the present invention.

For further explanation, FIG. 3 sets forth a flow chart illustrating a further exemplary method for repairing a hardware component of a computing system while workload continues to execute on the computing system according to embodiments of the present invention. The method of FIG. 3 is similar to the method of FIG. 2 in that the method of FIG. 3 also includes receiving (206) an indication that an operational parameter of a first hardware resource of said computing system does not meet operational acceptability criteria; migrating (208) workload (224) of the computing system (204) from said first hardware resource (222) to a second hardware resource (226) within the computing system; and halting (210) operation of said first hardware resource for repair.

As mentioned above, however, repairing the first hardware resource may take various forms. To that end, the method of FIG. 3 includes receiving (302) an indication that said first hardware resource is repaired and migrating (306) the previously migrated workload (224) of the computing system from the second hardware resource (224) to the repaired first hardware resource (308). Consider, for example, an over-heated processor. Rather than replacing the processor, repair may be possible through the application of thermal paste or direction of cool airflow and the like. In such an embodiment, a system administrator may send the hypervisor a notification upon repair which prompts the migration of the workload back to the repaired first hardware resource.

Figure 4:
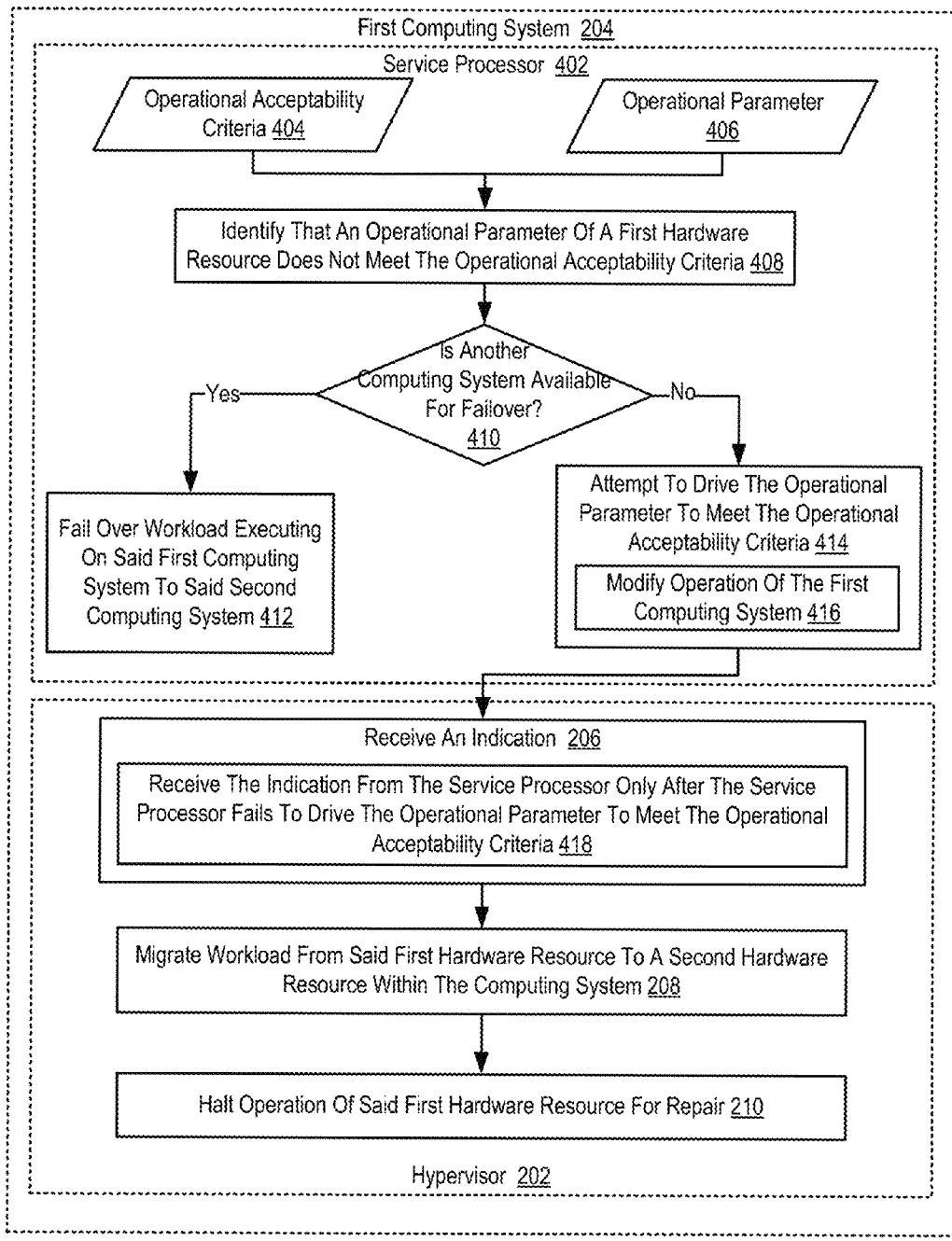
FIG. 4 sets forth a flow chart illustrating a further exemplary method for repairing a hardware component of a computing system while workload continues to execute on the computing system according to embodiments of the present invention.

For further explanation, FIG. 4 sets forth a flow chart illustrating a further exemplary method for repairing a hardware component of a computing system while workload continues to execute on the computing system according to embodiments of the present invention. The method of FIG. 4 is similar to the method of FIG. 2 in that the method of FIG. 4 also includes receiving (206) an indication that an operational parameter of a first hardware resource of said computing system does not meet operational acceptability criteria; migrating (208) workload (224) of the computing system (204) from said first hardware resource (222) to a second hardware resource (226) within the computing system; and halting (210) operation of said first hardware resource for repair.

The method of FIG. 4 differs from the method of FIG. 2, however, in that the method of FIG. 4 includes identifying (408), by a service processor (402) of said first computing system (204) that said operational parameter (406) of said first hardware resource does not meet the operational acceptability criteria (404). As mentioned above, identifying that the operational parameter does not meet operational acceptability criteria may be carried out in various ways depending on the hardware resource type, the operational parameter, and the criteria. Generally, the service processor may compare the operational parameter to the criteria. In some embodiments, the operational parameter may be a value such as a temperature, a rate of errors, and the like that may be compared to a criteria comprising a threshold. In such embodiments, the operational parameter is said to not meet the criteria when the operational parameter exceeds the threshold. In other embodiments, the criteria may be a range and the operational parameter may fail to meet the criteria if the operational parameter falls outside of the range. These are but a few examples of comparing an operational parameter to operational acceptability criteria. Readers of skill in the art will recognize that many other such comparisons may be made to determine whether an operational parameter meets operational acceptability criteria and each such way is well within the scope of the present disclosure.

The method of FIG. 4 continues by determining (410), by the service processor (402), whether a second computing system in said data center is available as a target for failover of said first computing system. Such a determination may be made by querying a system management server configured to maintain failover target status. Responsive to determining (410) that a second computing system is available as a target for failover of said first computing system, the method of FIG. 4 continues by failing over (412) workload executing on said first computing system to said second computing system.

Responsive to determining that a second computing system is not available as a target for failover of said first computing system, the method of FIG. 4 continues by attempting (4), by the service processor, to drive the operational parameter of said first hardware resource to meet said operational acceptability criteria. In the method of FIG. 4, attempting (414) to drive the operational parameter to meet the operational acceptability criteria is carried out by modifying (416) operation of the first computing system. Throttling clock speeds, throttling bus speeds, controlling fan speeds, and the like are just a few ways among many possible ways in which modifying operation of the first computing system may drive an operational parameter of a hardware resource to meet operational acceptability criteria.

In the method of FIG. 4, receiving (206), by the hypervisor, the indication that an operational parameter of a first hardware resource of said computing system does not meet operational acceptability criteria includes receiving (418) the indication from the service processor only after the service processor fails to drive the operational parameter of said first hardware resource to meet said operational acceptability criteria. That is, in the method of FIG. 4, the service processor only sends an indication of an operational parameter's failure to meet acceptability criteria if no other system is an available target for failover of the entire first computing system's workload and all attempts to drive the operational parameter to meet the operational acceptability criteria have failed.

Readers of skill in the art will recognize that these various phases: determining whether to failover the entire workload of the first computing system to a second computing system, attempting to drive the operational parameter to meet operational acceptability criteria, and migrating workload amongst hardware resources within the first computing system may be arranged in any order. For example, in some embodiments the service processor may, upon identifying (406) that an operational parameter of a first hardware resource does not meet the operational acceptability criteria, attempt (414) to drive the operational parameter to meet acceptability criteria by modifying the operation of the first computing system. Then, only after the attempt has failed the service processor may determine (410) whether another computing system is available as a target for failover of all workload of the first computing system. Then, only if no other computing system available as a target may the hypervisor migrate (208) workload within the computing system from the first hardware resource to the second. In another embodiment failing over the entire workload of the first computing system to another computing system may be the final step to take. Each of these alternative orders is well within the scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method comprising:
by computer program instructions on a service processor of a first computing system of a data center:
identifying that an operational parameter of a first hardware resource does not meet an operational acceptability criteria;
prior to migrating a workload from the first hardware resource to a second hardware resource, determining by the service processor of said first computing system whether a second computing system in said data center is available as a target for failover of said first computing system; and
responsive to determining that the second computing system is not available as a target for failover of said first computing system, attempting to drive the operational parameter of said first hardware resource to meet said operational acceptability criteria; and
by program instructions of a hypervisor executing on the first computing system:
receiving an indication that an operational parameter of a first hardware resource of said first computing system does not meet operational acceptability criteria;
migrating a workload of the first computing system from said first hardware resource to a second hardware resource within the first computing system; and
halting an operation of said first hardware resource for repair.

2. The method of claim 1 further comprising:
receiving an indication that said first hardware resource is repaired; and
migrating the previously migrated workload of the first computing system from the second hardware resource to the repaired first hardware resource.

3. The method of claim 1 further comprising:
detecting removal of said first hardware resource;
detecting a hot-installation of a replacement hardware resource; and
migrating the previously migrated workload of the computing system from the second hardware resource to the replacement hardware resource.

4. The method of claim 1, further comprises:
responsive to determining that the second computing system is available as a target for failover of said first computing system, failing over a workload executing on said first computing system to said second computing system.

5. The method of claim 1, wherein responsive to determining that the second computing system is not available as a target for failover of said first computing system, attempting, by the service processor, to drive the operational parameter of said first hardware resource to meet said operational acceptability criteria includes modifying an operation of the first computing system.

6. The method of claim 5, wherein:
receiving an indication that an operational parameter of a first hardware resource of said first computing system does not meet operational acceptability criteria further comprises receiving the indication from the service processor only after the service processor fails to drive the operational parameter of said first hardware resource to meet said operational acceptability criteria.

7. The method of claim 1 wherein said first hardware resource comprises one of:
a storage drive;
a computer processor;
a data communications adapter;
an input/output adapter;
a power supply; and
a Dual In-Line Memory Module (DIMM).

8. An apparatus comprising a computer processor and a computer memory operatively coupled to the computer processor, the computer memory having disposed within it computer program instructions that, when executed by the computer processor, cause the apparatus to carry out the steps of:
identifying, by a service processor of a first computing system in a data center that an operational parameter of a first hardware resource does not meet an operational acceptability criteria;
prior to migrating a workload from the first hardware resource to a second hardware resource, determining by the service processor of said first computing system whether a second computing system in said data center is available as a target for failover of said first computing system;
responsive to determining that the second computing system is not available as a target for failover of said first computing system, attempting, by the service processor, to drive the operational parameter of said first hardware resource to meet said operational acceptability criteria;

receiving an indication that an operational parameter of a first hardware resource of the first computing system does not meet operational acceptability criteria;

migrating a workload of the first computing system from said first hardware resource to a second hardware resource within the first computing system; and halting an operation of said first hardware resource for repair.

9. The apparatus of claim 8 further comprising computer program instructions that, when executed by the computer processor, cause the apparatus to carry out the steps of:

receiving an indication that said first hardware resource is repaired; and migrating the previously migrated workload of the first computing system from the second hardware resource to the repaired first hardware resource.

10. The apparatus of claim 8 further comprising computer program instructions that, when executed by the computer processor, cause the apparatus to carry out the steps of:

detecting removal of said first hardware resource;

detecting a hot-installation of a replacement hardware resource; and migrating the previously migrated workload of the computing system from the second hardware resource to the replacement hardware resource.

11. The apparatus of claim 8 further comprises computer program instructions that, when executed by the computer processor, cause the apparatus to carry out the steps of:

responsive to determining that the second computing system is available as a target for failover of said first computing system, failing over a workload executing on said first computing system to said second computing system.

12. The apparatus of claim 8, wherein responsive to determining that the second computing system is not available as a target for failover of said first computing system, attempting, by the service processor, to drive the operational parameter of said first hardware resource to meet said operational acceptability criteria includes modifying an operation of the first computing system.

13. The apparatus of claim 12, wherein:

receiving an indication that an operational parameter of a first hardware resource of said first computing system does not meet operational acceptability criteria further comprises receiving the indication from the service processor only after the service processor fails to drive the operational parameter of said first hardware resource to meet said operational acceptability criteria.

14. The apparatus of claim 8 wherein said first hardware resource comprises one of:

a storage drive;
a computer processor;
a data communications adapter;
an input/output adapter;
a power supply; and
a Dual In-Line Memory Module (DIMM).

15. A computer program product disposed upon a non-transitory computer readable medium, the computer program product comprising computer program instructions that, when executed, cause a computer to carry out the steps of:

identifying, by a service processor of a first computing system in a data center that an operational parameter of a first hardware resource does not meet an operational acceptability criteria;

prior to migrating a workload from the first hardware resource to a second hardware resource, determining by the service processor of said first computing system whether a second computing system in said data center is available as a target for failover of said first computing system;

responsive to determining that the second computing system is not available as a target for failover of said first computing system, attempting, by the service processor, to drive the operational parameter of said first hardware resource to meet said operational acceptability criteria;

receiving an indication that an operational parameter of a first hardware resource of the first computing system does not meet operational acceptability criteria;

migrating a workload of the first computing system from said first hardware resource to a second hardware resource within the first computing system; and halting an operation of said first hardware resource for repair.

16. The computer program product of claim 15 further comprising computer program instructions that, when executed, cause the computer to carry out the steps of:

receiving an indication that said first hardware resource is repaired; and migrating the previously migrated workload of the first computing system from the second hardware resource to the repaired first hardware resource.

17. The computer program product of claim 15 further comprising computer program instructions that, when executed, cause the computer to carry out the steps of:

detecting removal of said first hardware resource;

detecting a hot-installation of a replacement hardware resource; and migrating the previously migrated workload of the first computing system from the second hardware resource to the replacement hardware resource.

18. The computer program product of claim 15 further comprises computer program instructions that, when executed, cause the computer to carry out the steps of:

responsive to determining that the second computing system is available as a target for failover of said first computing system, failing over a workload executing on said first computing system to said second computing system.

19. The computer program product of claim 15, wherein responsive to determining that the second computing system is not available as a target for failover of said first computing system, attempting, by the service processor, to drive the operational parameter of said first hardware resource to meet said operational acceptability criteria includes modifying an operation of the first computing system.

20. The computer program product of claim 19, wherein:

receiving an indication that an operational parameter of a first hardware resource of said first computing system does not meet operational acceptability criteria further comprises receiving the indication from the service processor only after the service processor fails to drive the operational parameter of said first hardware resource to meet said operational acceptability criteria.

* * * * *